US009799125B1

(12) United States Patent
Wegner et al.

(10) Patent No.: US 9,799,125 B1
(45) Date of Patent: Oct. 24, 2017

(54) COLOR CONTROL USER INTERFACES

(71) Applicants: Scott David Wegner, Peachtree City, GA (US); Christopher L. Bohler, Peachtree City, GA (US)

(72) Inventors: Scott David Wegner, Peachtree City, GA (US); Christopher L. Bohler, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 48 days.

(21) Appl. No.: 14/836,687

(22) Filed: Aug. 26, 2015

Related U.S. Application Data

(60) Provisional application No. 62/041,883, filed on Aug. 26, 2014.

(51) Int. Cl.
G09G 5/04 (2006.01)
G06T 11/00 (2006.01)
G09G 5/30 (2006.01)

(52) U.S. Cl.
CPC ............ *G06T 11/001* (2013.01); *G09G 5/04* (2013.01); *G09G 5/30* (2013.01); *G09G 2354/00* (2013.01)

(58) Field of Classification Search
CPC .......... G06T 11/001; G09G 5/04; G09G 5/30; G09G 2354/00
See application file for complete search history.

(56) References Cited

U.S. PATENT DOCUMENTS

| 2012/0084126 A1* | 4/2012 | Zampini, II | ....... G06Q 30/0241 705/14.4 |
| 2015/0156554 A1* | 6/2015 | Sirpal | ................ H04N 21/4858 725/37 |
| 2016/0120009 A1* | 4/2016 | Aliakseyeu | ........ H05B 37/0272 315/131 |

OTHER PUBLICATIONS

"Colorotate", developed by Institute for Dynamic Educational Advancement, on sale in US on or before Jan. 25, 2010. http://web.colorotate.org/.*
"Philips Hue Connected Bulb—Starter Pack". p. 1-5, Oct. 30, 2012. http://www.apple.com/shop/product/HA779VC/A/philips-hue-connected-bulb-starter-pack.

* cited by examiner

Primary Examiner — Xiao Wu
Assistant Examiner — Chong Wu
(74) Attorney, Agent, or Firm — King & Spalding LLP

(57) ABSTRACT

A color control user interface can include a controller, a display area, and a three-dimensional shape generated by the controller and disposed in the display area. The three-dimensional shape can include a first axis that represents a first range of selections for a first color factor, a second axis that represents a second range of selections for a second color factor, and a third axis that represents a third range of selections for a third color factor. A control engine of the controller can be configured to receive user selections having a first selection of the first color factor, a second selection of the second color factor, and a third selection of the third color factor. The control engine can also be configured to compare the user selections to light source information stored in memory, and send commands via a transceiver to at least one light source.

19 Claims, 12 Drawing Sheets

COLOR CONTROL USER INTERFACES

CROSS REFERENCE TO RELATED APPLICATIONS

This application claims priority under 35 U.S.C. §119 to U.S. Provisional Patent Application Ser. No. 62/041,883, titled "Color Control User Interfaces" and filed on Aug. 26, 2014, the entire contents of which are hereby incorporated herein by reference.

TECHNICAL FIELD

Embodiments described herein relate generally to lighting controls, and more particularly to systems, methods, and devices for color control user interfaces.

BACKGROUND

Generally speaking, color has three characteristics or aspects that contribute to what people see. These characteristics (also called color factors herein) are hue, saturation, and value. The hue of a color is the point along the human visual spectrum of colors, real or perceived, (e.g., red, orange, yellow, green, blue, violet, and magenta) that the color falls. The saturation (also called chroma) is the purity of the color. The value (also called brightness or luminosity) is the lightness or darkness of the color. Thus, to arrive at a final color choice, these three characteristics must each be adjusted.

SUMMARY

In general, in one aspect, the disclosure relates to a color control user interface. The color control user interface can include a controller having a control engine, a transceiver, and a memory. The color control user interface can also include a display area and a three-dimensional shape generated by the controller and disposed in the display area. The three-dimensional shape can include a first axis that represents a first range of selections for a first color factor. The three-dimensional shape can also include a second axis that represents a second range of selections for a second color factor. The three-dimensional shape can further include a third axis that represents a third range of selections for a third color factor. Each of the first range of selections for the first color factor, the second range of selections for the second color factor, and the third range of selections for the third color factor can be selectable by a user. The control engine can be configured to receive user selections that include a first selection of the first color factor, a second selection of the second color factor, and a third selection of the third color factor. The control engine can also be configured to compare the user selections to light source information stored in the memory. The control engine can also be configured to send commands via the transceiver to at least one light source, where the commands adjust an amount of current delivered to the at least one light source.

In another aspect, the disclosure can generally relate to a color control user interface for lighting control. The color control user interface can include a first color factor generated by a controller and shown on a display in a first dimension and having a number of first selections. The color control user interface can also include a second color factor generated by the controller and shown on the display in a second dimension and having a number of second selections. The first color factor and the second color factor can be integrated, using the controller, within an image shown on the display. The image can have a first selection for the first color factor based on a first selection of the first selections selected by a user. The image can have a second selection for the second color factor based on a second selection of the second selections selected by the user. The first selection and the second selection can be selected simultaneously in a first single action by the user on the display. The first selection and the second selection can be received, substantially simultaneously with when they are selected, by the controller. The controller can be configured to compare the first selection and the second selection to light source information stored in memory, and to send commands, using a transceiver, to at least one light source, where the commands adjust am amount of current delivered to the at least one light source based on the first selection of the first color factor and the second selection of the second color factor.

In yet another aspect, the disclosure can generally relate to an electronic device. The electronic device can include a housing and a controller having a control engine, a transceiver, and a memory, where the controller generates an image and controls one or more light sources. The electronic device can also include a display disposed on the housing and coupled to the controller, where the display displays the image. The image can include a first color factor disposed in a first dimension of the image and having a number of first selections. The image can also include a second color factor disposed in a second dimension of the image and having a number of second selections. The image can have a first selection for the first color factor based on a first selection of the first selections selected by the user on the display. The image can have a second selection for the second color factor based on a second selection of the second selections selected by the user on the display. The first selection and the second selection can be selected simultaneously in a single action by the user on the display. The control engine of the controller can receive the first selection and the second selection, compare the first selection and the second selection to light source information stored in the memory, and, substantially simultaneously and using the transceiver, adjust an amount of current delivered to the one or more light sources, where the amount of current corresponds to the first selection and the second selection.

These and other aspects, objects, features, and embodiments will be apparent from the following description and the appended claims.

BRIEF DESCRIPTION OF THE DRAWINGS

The drawings illustrate only example embodiments of color control user interfaces and are therefore not to be considered limiting of its scope, as color control user interfaces may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
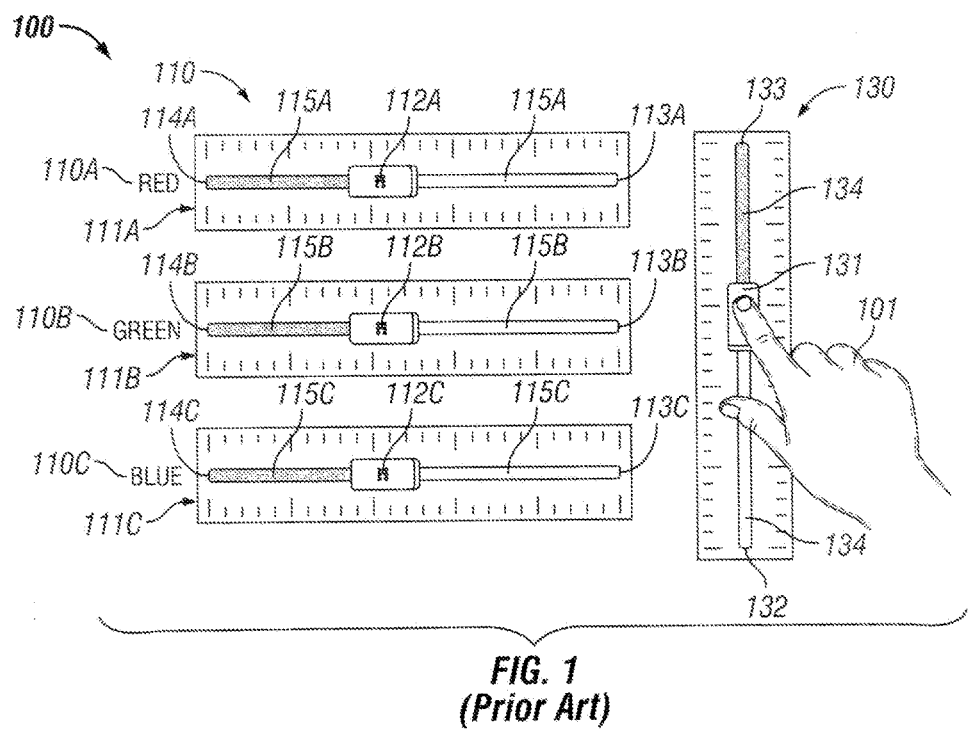
FIG. 1 shows a color control user interface according to embodiments currently known in the art.

The example embodiments discussed herein are directed to systems, apparatuses, graphical user interfaces, and methods of color control user interfaces. As described herein, a user can be any person that interacts with example color control user interfaces. Examples of a user may include, but are not limited to, a consumer, a homeowner, an electrician, an engineer, a consultant, a contractor, an operator, and a manufacturer's representative.

Example color control user interfaces described herein can be a graphical user interface (GUI) that is accessible on one or more of a number of devices. Examples of such devices can include, but are not limited to, a stand-alone device, a wall-mounted device, a mobile device (e.g., cell phone, tablet, laptop computer), and a desktop computer. Alternatively, example color control user interfaces can be a GUI that is accessible at a point or area of space.

In the foregoing figures showing example embodiments of color control user interfaces, one or more of the components shown may be omitted, added, repeated, and/or substituted. Accordingly, example embodiments of color control user interfaces should not be considered limited to the specific arrangements of components shown in any of the figures. For example, features shown in one or more figures or described with respect to one embodiment can be applied to another embodiment associated with a different figure or description.

Example embodiments of color control user interfaces will be described more fully hereinafter with reference to the accompanying drawings, in which example color control user interfaces are shown. Color control user interfaces may, however, be embodied in many different forms and should not be construed as limited to the example embodiments set forth herein. Rather, these example embodiments are provided so that this disclosure will be thorough and complete, and will fully convey the scope of color control user interfaces to those of ordinary skill in the art. Like, but not necessarily the same, elements (also sometimes called components) in the various figures are denoted by like reference numerals for consistency.

Terms such as "top", "bottom", "left", "right", "first", and "second" are used merely to distinguish one component (or part of a component or state of a component) from another. Such terms are not meant to denote a preference or a particular orientation. Also, the names given to various components described herein are descriptive of example embodiments and are not meant to be limiting in any way. Those skilled in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows a color control user interface 100 currently known in the art. The color control user interface 100 of FIG. 1 includes a hue/saturation control 110 and a value (also called tone or lightness) control 130. The hue/saturation control 110 has three portions: a red portion 110A, a green portion 110B, and a blue portion 110C. The value control 130 in this case is in the form of a slidebar, having a slot 134 in which a selector 131 can be moved by a user 101. The slot 134 is bounded by a top end 133 and a bottom end 132. The position of the selector 131 along the slot 134 determines the value of the light controlled by the color control user interface 100.

The red portion 110A, the green portion 110B, and the blue portion 110C of the hue/saturation control 110 are arranged similar to each other and, in this case, are arranged similar to the value control 130. Specifically, the red portion 110A of the hue/saturation control 110 is a slidebar, having a slot 114A in which a selector 111A can be moved by a user 101. The slot 114A is bounded by a left end 113A and a right end 112A. The position of the selector 111A along the slot 114A determines the red portion of the hue/saturation of the light controlled by the color control user interface 100.

The green portion 110B of the hue/saturation control 110 is a slidebar, having a slot 114B in which a selector 111B can be moved by a user 101. The slot 114B is bounded by a left end 113B and a right end 112B. The position of the selector 111B along the slot 114B determines the red portion of the hue/saturation of the light controlled by the color control user interface 100. The blue portion 110C of the hue/saturation control 110 is a slidebar, having a slot 114C in which a selector 111C can be moved by a user 101. The slot 114C is bounded by a left end 113C and a right end 112C. The position of the selector 111C along the slot 114C determines the red portion of the hue/saturation of the light controlled by the color control user interface 100.

Since the hue/saturation control 110 and the value control 130 of the color control user interface 100 are each two-dimensional controls (selecting a point along a line), the user 101 must separately adjust each control to achieve the desired color. In other words, the user 101 must use multiple motions, often in discrete steps, in order to adjust the various aspects of the color to the desired levels using the color control user interface 100 of FIG. 1.

Figure 2:
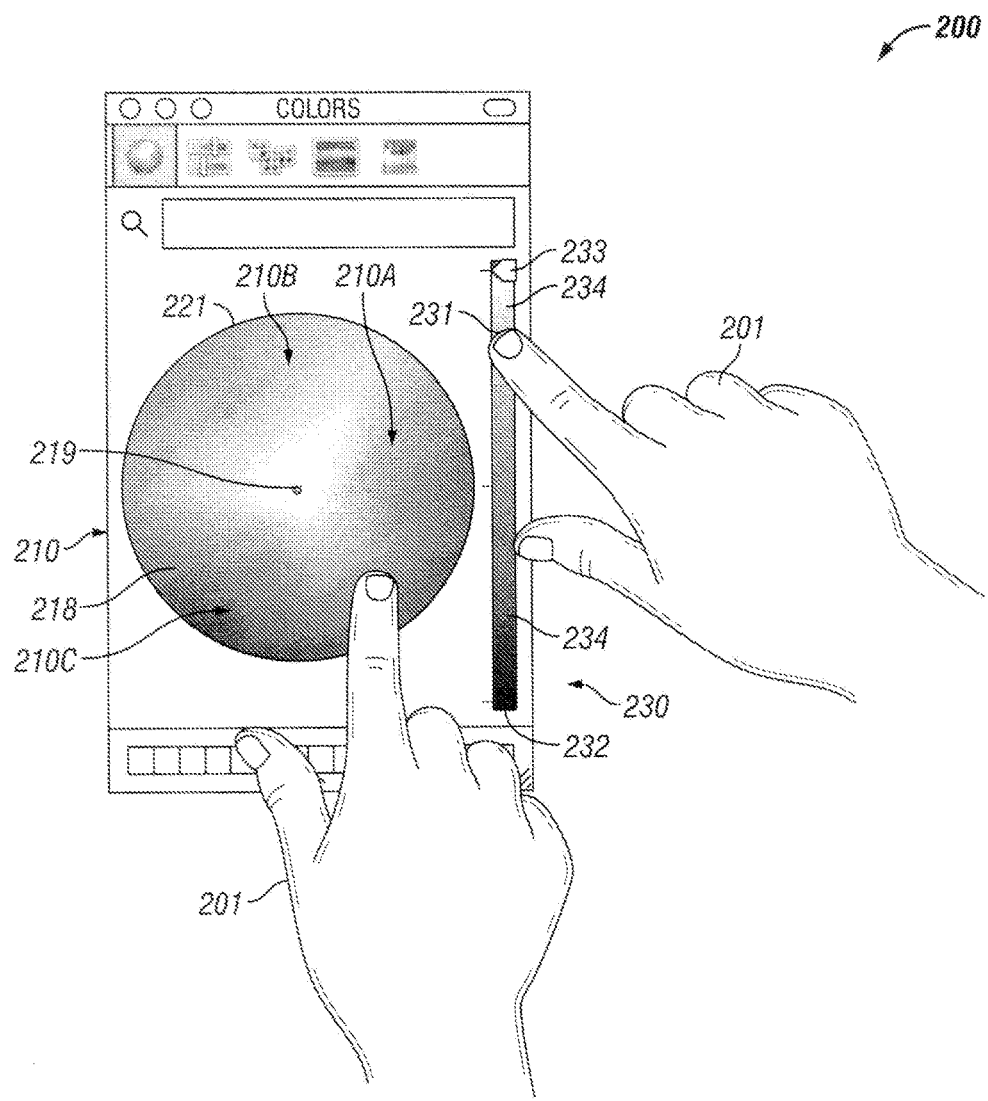
FIG. 2 shows another color control user interface according to embodiments currently known in the art.

FIG. 2 shows another color control user interface 200 currently known in the art. The color control user interface 200 of FIG. 2 includes a hue/saturation control 210 and a value control 230. The hue/saturation control 210 of FIG. 2 is substantially an integrated, two-dimensional combination of the three selectors 111A-111C of the hue saturation control 110 of FIG. 1. The value control 230 of the color control user interface 200 of FIG. 2 is substantially the same as the value control 130 of the color control user interface 100 of FIG. 1.

The hue/saturation control 210 in this case is a color wheel 218 that is substantially circular in shape. The color wheel 218 has a center 219 and an outer perimeter 221. The various portions (red, green, blue) of the hue/saturation control 110 are essentially wedges in the color wheel 218. In this case, the red portion 210A is placed to the right of center 219 in the color wheel 218, the green portion 210B is placed to the upper left of center 219 in the color wheel 218, and the blue portion 210C is placed to the lower left of center 219 in the color wheel 218.

The red portion 210A, the green portion 210B, and the blue portion 210C are each approximately 120° in width, and the transition between the various portions is substantially continuous along the color spectrum. In other words, the transition between the red portion 210A and the green portion 210B are shades of yellow, the transition between the green portion 210B and the blue portion 210C are shades of aqua, and the transition between the red portion 210A and the blue portion 210C are shades of purple.

The hue of the hue/saturation control 210 can be selected based on a point (e.g., in degrees) in a circle around the center 219 of the color wheel 218. For example, if a 0° reference point is a horizontal line that extends left of the center 219 of the color wheel 218 (where the transition between the green portion 210B and the blue portion 210C is located in FIG. 2), then in a clockwise direction (rotational axis) the middle of the green portion 210B is at approximately 60°, the transition between the red portion 210A and the green portion 210B is at approximately 120°, the middle of the red portion 210A is at approximately 180°, the transition between the red portion 210A and the blue portion 210C at approximately 240°, and the middle of the blue portion 210C is at approximately 300°.

The saturation of the hue/saturation control 210 can be selected based on a distance (e.g., a radius) from the center 219 of the color wheel 218. As the distance is closer to the center 219 of the color wheel 218, the saturation is low (toward a minimum saturation level). As the distance approaches the outer perimeter 221 of the color wheel 218 is high (toward a maximum saturation level).

As with the color control user interface 100 of FIG. 1, the hue/saturation control 210 and the value control 230 of the color control user interface 200 of FIG. 2 are each two-dimensional controls (selecting a point along a line). As such, the user 201 must separately adjust each control to achieve the desired color. In other words, the user 201 must use multiple motions, often in discrete steps, in order to adjust the various aspects of the color to the desired levels using the color control user interface 200 of FIG. 2.

Figure 3:
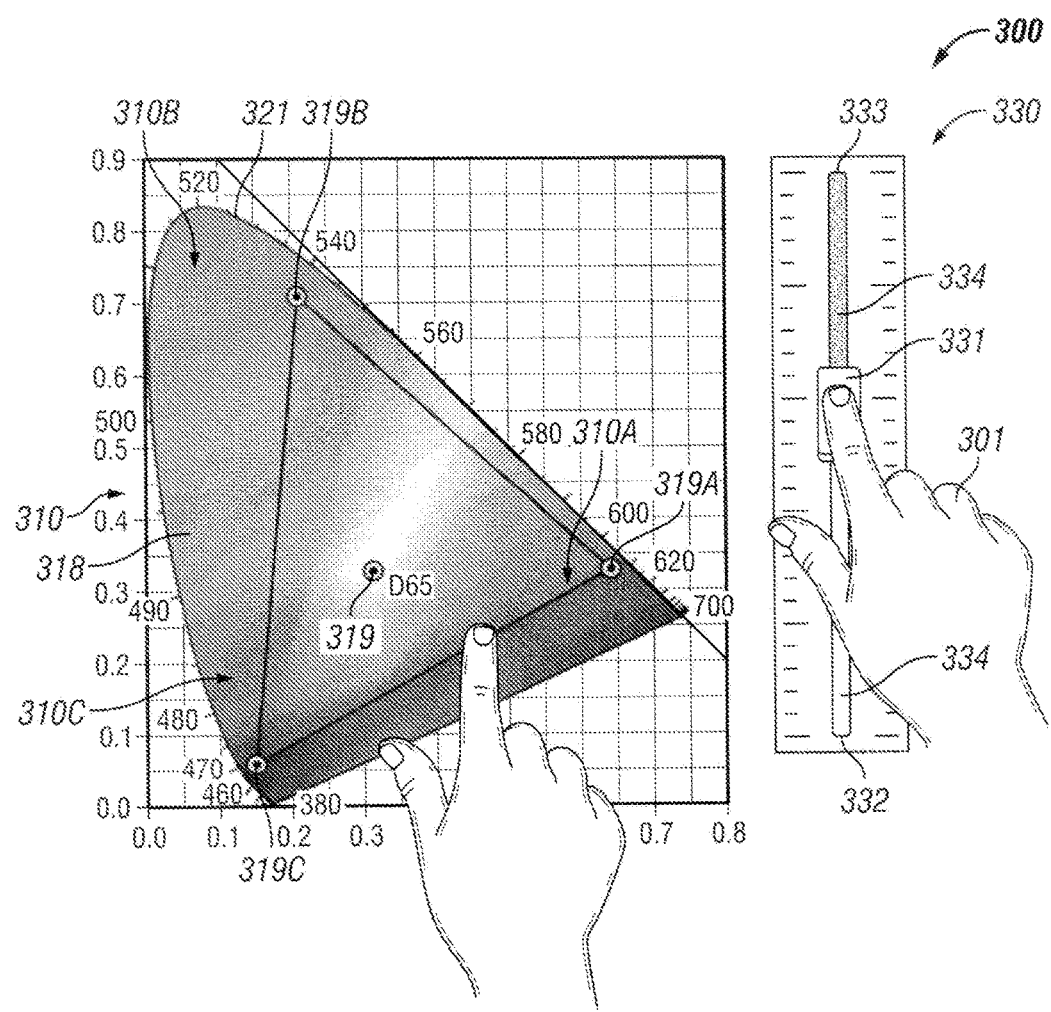
FIG. 3 shows yet another color control user interface according to embodiments currently known in the art.

FIG. 3 shows another color control user interface 300 currently known in the art. The color control user interface 300 of FIG. 3 includes a hue/saturation control 310 and a value control 330. The hue/saturation control 310 of FIG. 3 is substantially a combination of the of the three selectors 111A-111C of the hue/saturation control 110 of FIG. 1 and is substantially similar to the hue/saturation control 210 of FIG. 2, except as described below. The value control 330 of the color control user interface 300 of FIG. 3 is substantially the same as the value control 130 of the color control user interface 100 of FIG. 1.

The hue/saturation control 310 of FIG. 3 is a CIE color space 318, originally created by the International Commission on Illumination (CIE). The curved outer perimeter 321 of the CIE color space 318 is the spectral locus, with the wavelength shown in nanometers. The CIE color space 318 has a "center" 319 that is an equal amount of hue and a minimal amount of saturation of each color. As with the color wheel 218 of FIG. 2, the CIE color space 318 that represents the hue/saturation control 310 of FIG. 3 is substantially an integrated, two-dimensional combination of the red portion 310A (having a "center" 319A), the green portion 310B (having a "center" 319B), and the blue portion 310C (having a "center" 319C).

As with the color control user interface 100 of FIG. 1 and the color control user interface 200 of FIG. 2, the hue/saturation control 310 and the value control 330 of the color control user interface 300 of FIG. 3 are each two-dimensional controls (selecting a point along a line). As such, the user 301 must separately adjust each control to achieve the desired color. In other words, the user 301 must use multiple motions, often in discrete steps, in order to adjust the various aspects of the color to the desired levels using the color control user interface 300 of FIG. 3.

Figure 4:
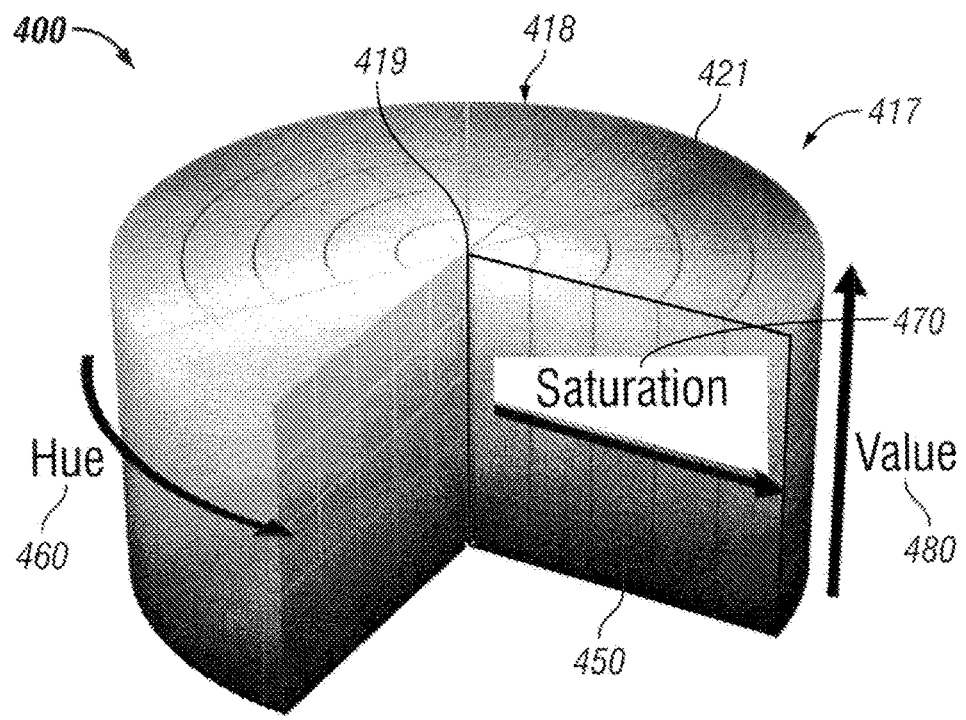
FIG. 4 shows a color control user interface in accordance with certain example embodiments.

FIG. 4 shows a color control user interface 400 in accordance with certain example embodiments. Referring to FIGS. 1-4, the color control user interface 400 of FIG. 4 is a two-dimensional area 417 (or, in some cases, a three-dimensional volume) that has disposed therein a three-dimensional shape 418 that integrates the three color factors (i.e., the hue 460, the saturation 470, and the value 480) into a single shape. As a result, a user can use a single, substantially fluid motion to adjust the various aspects of the color (color factors) to the desired levels using the color control user interface 400 of FIG. 4. In this example, the three-dimensional shape 418 of the color control user interface 400 is a cylinder. The three-dimensional shape 418 can have one or more of a number of other shapes, including but not limited to a cone, a three-dimensional paraboloid, a sphere, a cube, and a pyramid. In certain example embodiments, each color factor is associated with an axis (or a combination of axes) of the three-dimensional shape 418.

The height of the three-dimensional shape 418 in this case represents the value 480, the radius (distance from the center 419 on a horizontal plane to the outer perimeter 421 on the horizontal plane, also called a radial axis) represents the saturation 470, and the angular position (rotational axis) within a horizontal plane represents the hue 460. Specifically, the vertical direction (corresponding to the height) of the three-dimensional shape 418 has a range of selections (values) for the value of the color. The radial direction of the three-dimensional shape 418 has a range of selections (values) for the saturation 470 of the color. The angular direction of the three-dimensional shape 418 has a range of selections (values) for the hue 460 of the color. Essentially, the three-dimensional shape 418 in this case can be viewed as a number of color wheels (each similar to the color wheel 218 described above with respect to FIG. 2) stacked atop each other, where each color wheel represents a horizontal plane in the three-dimensional shape 418 having an increased value 480 for each color wheel stacked vertically atop one or more other color wheels.

Each of the vertically-arranged color wheels of the three-dimensional shape 418 can be configured as a full circle (as shown above in FIG. 2) or a wedge having coverage of less than 360°. In the latter case, the size (coverage) of the wedge can cover any angle between 0° and 360°, and the size of each color wheel can be the same as, or different than, the size of one or more other color wheels in the three-dimensional shape 418. Also, when forming the three-dimensional shape 418, the alignment of the wedges of the vertically-arranged color wheels of the three-dimensional shape 418 can form a pattern (e.g., linear, curved) or can be random.

A control window 450, such as is shown in FIG. 4, can be used to translate two selected color factors (in this case, the hue 460 and the saturation 470) of the three color factors into a portion of the color control user interface 400 that allows a user to subsequently select the third color factor (in this case, the value 480) in a single, continuous motion. An example of how the example color control user interface 400 can be used is described below with respect to FIGS. 6A-6C.

The arrangement (orientation) of the color factors of an example color control user interface described herein can vary. For example, as shown with the color control user interface 400 of FIG. 4, the height of the cylinder 418 can be the saturation 470, the radial direction can be represented by the hue 460, and the angular position in a horizontal plane can be represented by the value 480. As another example, the height of the cylinder 418 can be the saturation 470, the radial direction can be represented by the value 480, and the angular position in a horizontal plane can be represented by the hue 460.

Figure 5:
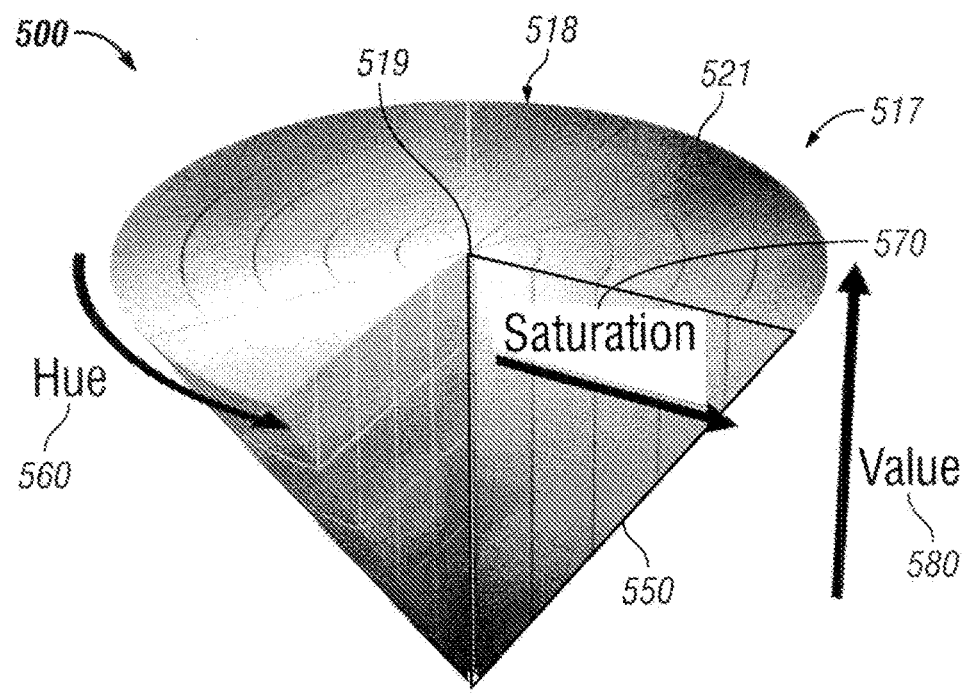
FIG. 5 shows another color control user interface in accordance with certain example embodiments.

FIG. 5 shows another color control user interface 500 in accordance with certain example embodiments. Referring to FIGS. 1-5, the color control user interface 500 of FIG. 5 is substantially the same as the color control user interface 400 of FIG. 4, except that the three-dimensional shape 518 disposed on the two-dimensional area 517 of the color control user interface 500 of FIG. 5 is a cone instead of the cylinder of the three-dimensional shape 418 disposed on the two-dimensional area 417 of the color control user interface 400 of FIG. 4. The numbering scheme for the components of the color control user interface 500 of FIG. 5 parallel the numbering scheme for the components of the color control user interface 400 of FIG. 4 in that each component is a three digit number having the identical last two digits.

The height of the three-dimensional shape 518 in this case represents the value 580, the radius (distance from the center 519 on a horizontal plane to the outer perimeter 521 on the horizontal plane, also called a radial axis) represents the saturation 570, and the angular position (rotational axis) within a horizontal plane represents the hue 560. Essentially, the three-dimensional shape 518 in this case can be viewed as a number of color wheels stacked atop each other, where each color wheel represents a horizontal plane in the three-dimensional shape 518 having an increased value 580 for each color wheel stacked vertically atop one or more other color wheels. Also, in this case, the range of the saturation 570 and the range of the hue 560 become more condensed as the value 580 decreases.

Each of the vertically-arranged color wheels of the three-dimensional shape 518 can be configured as a full circle or a wedge having coverage of less than 360°. In the latter case, the size (coverage) of the wedge can cover any angle between 0° and 360°, and the size of each color wheel can be the same as, or different than, the size of one or more other color wheels in the three-dimensional shape 518. Also, when forming the three-dimensional shape 518, the alignment of the wedges of the vertically-arranged color wheels of the three-dimensional shape 518 can form a pattern (e.g., linear, curved) or can be random.

The color control user interface 500 of FIG. 5 can also include a control window 550 that is substantially similar to the control window 450 of FIG. 4 above. The control window 550 in FIG. 5 can be used to translate two selected color factors (in this case, the hue 560 and the saturation 570) of the three color factors into a portion of the color control user interface 500 that allows a user to subsequently select the third color factor (in this case, the value 580) in a single, continuous motion.

Figure 6A:
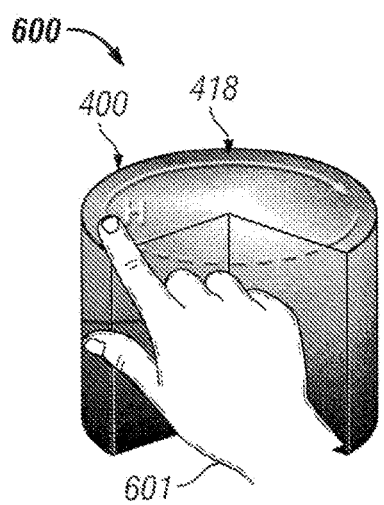
FIGS. 6A-6C show a graphical depiction of a method for a user to control color using the color control user interface of FIG. 4 in accordance with certain example embodiments.
Figure 6B:
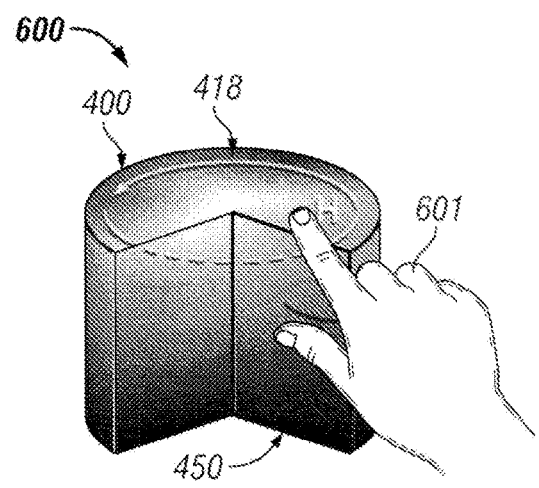
Figure 6C:
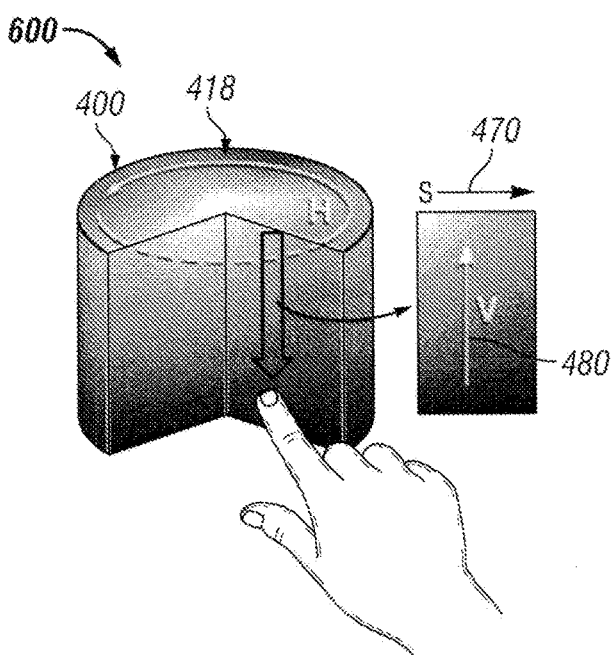

FIGS. 6A-6C show a graphical depiction of a method 600 for a user 601 to control color using the color control user interface 400 of FIG. 4 in accordance with certain example embodiments. Referring to FIGS. 1-6C, the method 600 begins with FIG. 6A, where the user 601 selects two of the three color factors. In this case, the user 601 selects two color factors (in this case, the hue 460 and the saturation 470) in a horizontal plane (color wheel) of the three-dimensional shape 418. Specifically, the user selects from among the range of selections for the hue 460 and a different range of selections for the saturation 470

To select the two color factors in a horizontal plane, the user 601 can perform one or more of a number of acts to confirm the selection of the user 601. For example, the user 601 can hold the selection (e.g., hold a finger (or some other selector, such as a stylus or a laser pointer, generally called a "finger" herein) in place at the location of the selection) of the two color factors for some period of time (e.g., two seconds). As another example, the user 601 can apply pressure to the selection of the two color factors. As yet another example, the user 601 can tap the selection of the two color factors one or more times.

A selection of any one or more color factors on a color control user interface 400 can be performed by a user 601 in one or more of a number of ways. For example, as shown in the figures, the user can use a finger that touches or hovers proximate to a surface (e.g., a screen) used to display the color control user interface 400. As another example, voice recognition software can be integrated with the color control user interface 400 so that a user 601 can speak to indicate a location (e.g., coordinates) and/or direction to select one or more color factors on the color control user interface 400. As yet another example, a user 601 can use a mouse.

Once the user 601 selects two of the color factors, the user 601 creates a control window 450 that is based on the two selected color factors (in this case, the hue 460 and the saturation 470), as shown in FIG. 6B. The control window 450 can be created automatically upon selection of the two selected color factors. Alternatively, the user 601 can create the control window 450 by performing an act. For example, the user 601 can drag the selection of the two color factors in FIG. 6A to a point on the color control user interface 400, at which point the control window 450 appears. In this example, the user 601 drags the selection to the right-facing wedge opening of the three-dimensional shape 418, at which point the control window 450 appears. In any case, the creation of the control window 450 does not require the user 601 to lift a finger or otherwise break the continuity of motion from selecting the first two color factors in FIG. 6A and selecting the final color factor in FIG. 6C.

Once the control window 450 appears, the user can select the third of the three color factors. With the arrangement and orientation of the three-dimensional shape 418 of FIG. 4, the user 601 moves a finger in a vertical motion within the control window 450 to select the value 480. The vertical movement can be upward and/or downward. In other words, the starting point of the user 601 within the control window 450 can be at the top of the control window 450, at the bottom of the control window 450, in the middle of the control window 450, or at some other point within the control window 450.

In certain example embodiments, one of the two color factors selected in the portion of the method 600 associated with FIG. 6A can be adjusted within the control window 450. Specifically, the control window 450 can have a width along some or all of its height that allows the user 450 to select the as-yet unselected color factor (in this case, the value 480) in the vertical direction, but also re-select (or adjust) the previously-selected color value oriented in the radial direction (in this case, the saturation 470).

In certain example embodiments, the method ends when the user 601 performs some act relative to the control window 450. For example, the selection of the three color factors can be considered final when the user 601 removes the finger from the color control user interface 400. As another example, the selection of the three color factors can be considered final when the user 601 keeps the finger in a stationary position for some period of time (e.g., five seconds). As yet another example, the selection of the three color factors can be considered final when some period of time passes after the control window 450 has been created. Alternatively, the color control user interface 400 can include a pushbutton (not shown) or similar feature that, once enabled by a user, locks in the color factors chosen by the user. In such a case, the pushbutton may say "DONE" or "SELECT" or "FINISH" to indicate to the user that, once selected by the user, the color factors chosen by the user will become enabled.

Figure 7:
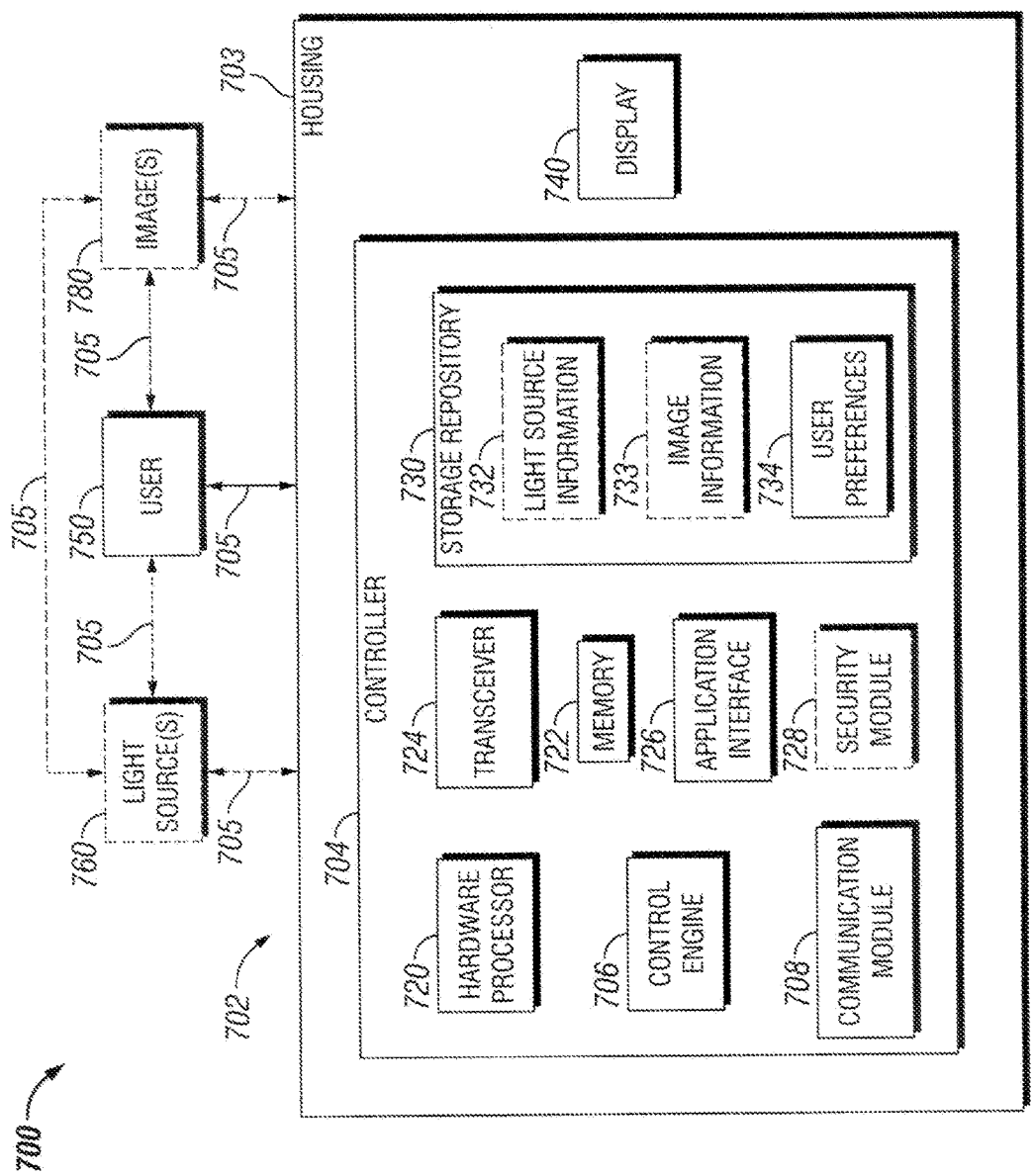
FIG. 7 shows a system diagram of a color control system in accordance with certain example embodiments.

FIG. 7 shows a system diagram of a color control system 700 that includes a color control user interface 702 in accordance with certain example embodiments. The color control system 700 can include one or more optional light sources 760, a user 750, one or more optional images 780, and a color control user interface 702. The color control user interface 702 can include a controller 704 and a display 740. The controller 704 can include one or more of a number of components. Such components, can include, but are not limited to, a control engine 706, a communication module 708, a storage repository 730, a hardware processor 720, a memory 722, a transceiver 724, an application interface 726, and, optionally, a security module 728. The components shown in FIG. 7 are not exhaustive, and in some embodiments, one or more of the components shown in FIG. 7 may not be included in an example color control user interface. Any component of the example color control user interface 702 can be discrete or combined with one or more other components of the color control user interface 702.

The user 750 is the same as a user defined above. The user 750 interacts with (e.g., sends data to, receives data from) the controller 704 of the color control user interface 702 via the display 740 and/or the application interface 726 (described below). The user 750 can also interact with one or more images 780 and/or one or more light sources 760. Interaction between the user 750 and the color control user interface 702, the images 780, and the light sources 760 is conducted using communication links 705. Each communication link 705 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 705 can be (or include) one or more electrical conductors that are coupled to the housing 703 of the color control user interface 702 and to a light source 760. The communication link 705 can transmit signals (e.g., communication signals, control signals, data) between the color control user interface 702 and the user 750, one or more of the images 780, and/or one or more of the light sources 760.

The images 780 can be any type of image. Examples of an image can include, but are not limited to, a photograph, a painting, a sign, a billboard, a sculpture, a mural, a movie, a space (e.g., a room), and a video. An image 780 can be static or moving. An image 780 can be digital, virtual, or actual. An image 780 can be communicated to the color control user interface 702 using a camera or similar device that has communication capability. In such a case, the image 780 (or system (e.g., camera) thereof) can use one or more of a number of communication protocols.

A light source 760 can be any source of light that is controllable (e.g., adjust the hue, adjust the value, adjust the saturation). A light source 760 can be a light fixture, one of a number of light sources within a light fixture, a grouping of light fixtures, or any other suitable source of light. Each light source 760 can use one or more of a number of communication protocols. A light source 760 can be configured to emit light in the vicinity of one or more of the images 780. When a light source 760 and/or an image 780 is located outside the housing 703 of the color control user interface 702, the light source 760 and/or the image 780 can be called a remote device.

A light source 760 and or an image 780 can include (be associated with) one or more sensors. These sensors can monitor conditions in and/or around the light source 760 and/or the image 780. Examples of such conditions can include, but are not limited to, a level of ambient light, a temperature, and the presence of a person. Examples of a sensor can include, but is not limited to, a photocell, an infrared light detector, a thermometer, and an acoustic detector. The controller 704 can interact (periodically, continually, randomly) with a light source 760 and/or an image 780, or any components (e.g., a sensor) thereof.

The user 750, the image 780, and/or the light sources 760 can interact with the controller 704 of the color control user interface 702 using the application interface 726 in accordance with one or more example embodiments. Specifically, the application interface 726 of the controller 704 receives data (e.g., information, communications, instructions) from and sends data (e.g., information, communications, instructions) to the user 750, the image 780, and/or the light sources 760.

In certain example embodiments, the display 740 of the color control user interface 702 provides a user 750 an interface to receive data from and send data to, using the controller 704, an image 780 and/or a light source 760. Examples of the display 740 can include, but are not limited to, a graphical user interface (GUI), a touchscreen, an application programming interface, a space in a room, a keyboard, a monitor, a mouse, a web service, a data protocol adapter, some other hardware and/or software component, or any suitable combination thereof.

The display 740 can be a two-dimensional display area that shows an image (e.g., a still picture, a video, a live feed, a three-dimensional shape 418). In some cases, the display 740 is a three-dimensional volume of space (which can generally be referred to as a display area herein) into which an image is projected and where a user 750 can interact, directly or indirectly, with the image to control one or more color factors associated with the image.

The controller 704, the user 750, and/or the light sources 760 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 704. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 12.

Further, as discussed above, such a system can have corresponding software (e.g., user software, light source software, controller software, image software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 700.

The color control user interface 702 can include a housing 703. The housing 703 can include at least one wall that forms a cavity. The housing 703 of the color control user interface 702 can be used to house one or more components of the color control user interface 702, including one or more components of the controller 704. For example, as shown in FIG. 7, the controller 704 (which in this case includes the control engine 706, the communication module 708, the storage repository 730, the hardware processor 720, the memory 722, the transceiver 724, the application interface 726, and the optional security module 728) and the display 740 can be disposed within the cavity formed by the housing 703. In alternative embodiments, any one or more of these or other components of the color control user interface 702 can be disposed on the housing 703 and/or remotely from the housing 703.

The storage repository 730 can be a persistent storage device (or set of devices) that stores software and data used to assist the controller 704 in communicating with the user 750, one or more images 780, and one or more light sources 760 within the system 700. In one or more example embodiments, the storage repository 730 stores optional light source information 732, optional image information 733, and user preferences 734. The light source information 732 can be any information associated with a light source 760. Such information can include, but is not limited to, color capability of the light source 760, dimming capability of the light source 760, manufacturer's information of the light source 760, age of the light source 760, hours of operation of the light source 760, communication protocols of the light source 760, physical location of the light source 760, current light output of the light source 760, and orientation of the light source 760.

The image information 733 can be any digital images stored. Such digital images can be of an image 780 or of some other image. If the image 733 is of an image 780, then the image 733 can include information about the image, including but not limited to the size, the location, the orientation, the colors, the ambient conditions (natural lighting, temperature) where the image is located, and the proximately located light sources 760. In some cases, image information 733 can include information about a system (e.g., a camera) that is associated with an image 780. In such a case, image information 733 can include, but is not limited to, operating parameters of the system associated with the image 780, communication protocols of the system associated with the image 780, and the location of the system associated with the image 780. The user preferences 734 can be any data associated the preferences of a particular user 750. Such preferences can include, but are not limited to, a layout on the display 740, color preferences, three-dimensional shapes (e.g., three-dimensional shape 418).

Examples of a storage repository 730 can include, but are not limited to, a database (or a number of databases), a file system, a hard drive, flash memory, some other form of solid state data storage, or any suitable combination thereof. The storage repository 730 can be located on multiple physical machines, each storing all or a portion of the light source information 732, image information 733, and/or the user preferences 734 according to some example embodiments. Each storage unit or device can be physically located in the same or in a different geographic location.

The storage repository 730 can be operatively connected to the control engine 706. In one or more example embodiments, the control engine 706 includes functionality to communicate with the user 750, the images 780, and the light sources 760 in the system 700. More specifically, the control engine 706 sends information to and/or receives information from the storage repository 730 in order to communicate with the user 750, the images 780, and the light sources 760. As discussed below, the storage repository 730 can also be operatively connected to the communication module 708 in certain example embodiments.

In certain example embodiments, the control engine 706 of the controller 704 controls the operation of one or more components (e.g., the communication module 708, the transceiver 724) of the controller 704. For example, the control engine 706 can put the communication module 708 in "sleep" mode when there are no communications between the controller 704 and another component (e.g., a light source 760, the user 750) in the system 700 or when communications between the controller 704 and another component in the system 700 follow a regular pattern. In such a case, power consumed by the controller 704 is conserved by only enabling the communication module 708 when the communication module 708 is needed.

The control engine 706 can provide control, communication, and/or other similar signals to the user 750, one or more of the images 780, and one or more of the light sources 760. Similarly, the control engine 706 can receive control, communication, and/or other similar signals from the user 750, one or more of the images 780, and one or more of the light sources 760. The control engine 706 can control each light source 760 and/or image 780 automatically (for example, based on one or more algorithms stored in the control engine 706) and/or based on control, communication, and/or other similar signals received from another device through a communication link 705. The control engine 706 may include a printed circuit board, upon which the hardware processor 720 and/or one or more discrete components of the controller 704 can be positioned.

In certain example embodiments, the control engine 706 can include an interface that enables the control engine 706 to communicate with one or more components (e.g., the display 740) of the color control user interface 702. For example, if the power source for the color control user interface 702 operates under IEC Standard 62386, then the power module 140 can include a digital addressable lighting interface (DALI). In such a case, the control engine 706 can also include a DALI to enable communication with the power module 140 within the color control user interface 702. Such an interface can operate in conjunction with, or independently of, the communication protocols 132 used to communicate between the controller 704 and the user 750, the images 780, and the light sources 760.

The control engine 706 can operate in real time. In other words, as any changes (e.g., discrete, continuous) are made to the three-dimensional shape on the display 740, the control engine 706 of the controller 704 can, at substantially the same time, control a light source 760 and/or an image 780 based on the changes to the three-dimensional shape. In addition, the control engine 706 of the controller 704 can perform one or more of its functions continuously. For example, the controller 704 can continuously communicate retrieve light source information 732 and/or image information 733. In such a case, any updates or changes to such information (e.g., a change in ambient lighting) can be used by the controller 704 in adjusting an output (e.g., current) sent to a light source 760 and/or an image 780 based on the selection of one or more color factors by a user 750.

The control engine 706 (or other components of the controller 704) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

In certain example embodiments, the communication module 708 of the controller 704 determines and implements the communication protocol (e.g., from the light source information 732 and the image information 733 of the storage repository 730) that is used when the control engine 706 communicates with (e.g., sends signals to, receives signals from) the user 750, one or more of the images 780, and/or one or more of the light sources 760. In some cases, the communication module 708 accesses the light source information 732 and/or the image information 733 to determine which communication protocol is within the capability of the recipient of a communication sent by the control engine 706. In addition, the communication module 708 can interpret the communication protocol of a communication received by the controller 704 so that the control engine 706 can interpret the communication.

The communication module 708 can send data directly to and/or retrieve data directly from the storage repository 730. Alternatively, the control engine 706 can facilitate the transfer of data between the communication module 708 and the storage repository 730. The communication module 708 can also provide encryption to data that is sent by the controller 704 and decryption to data that is received by the controller 704. The communication module 708 can also provide one or more of a number of other services with respect to data sent from and received by the controller 704. Such services can include, but are not limited to, data packet routing information and procedures to follow in the event of data interruption.

The hardware processor 720 of the controller 704 executes software in accordance with one or more example embodiments. Specifically, the hardware processor 720 can execute software on the control engine 706 or any other portion of the controller 704, as well as software used by the user 750, one or more of the images 780, and/or one or more of the light sources 760. The hardware processor 720 can be an integrated circuit, a central processing unit, a multi-core processing chip, a multi-chip module including multiple multi-core processing chips, or other hardware processor in one or more example embodiments. The hardware processor 720 is known by other names, including but not limited to a computer processor, a microprocessor, and a multi-core processor.

In one or more example embodiments, the hardware processor 720 executes software instructions stored in memory 722. The memory 722 includes one or more cache memories, main memory, and/or any other suitable type of memory. The memory 722 is discretely located within the controller 704 relative to the hardware processor 720 according to some example embodiments. In certain configurations, the memory 722 can be integrated with the hardware processor 720.

In certain example embodiments, the controller 704 does not include a hardware processor 720. In such a case, the controller 704 can include, as an example, one or more field programmable gate arrays (FPGA). Using FPGAs and/or other similar devices known in the art allows the controller 704 (or portions thereof) to be programmable and function according to certain logic rules and thresholds without the use of a hardware processor.

The transceiver 724 of the controller 704 can send and/or receive control and/or communication signals. Specifically, the transceiver 724 can be used to transfer data between the controller 704 and the user 750, the images 780, and/or the light sources 760. The transceiver 724 can use wired and/or wireless technology. The transceiver 724 can be configured in such a way that the control and/or communication signals sent and/or received by the transceiver 724 can be received and/or sent by another transceiver that is part of the user 750, the images 780, and/or the light sources 760.

When the transceiver 724 uses wireless technology as the communication link 705, any type of wireless technology can be used by the transceiver 724 in sending and receiving signals. Such wireless technology can include, but is not limited to, Wi-Fi, visible light communication, cellular networking, and Bluetooth. The transceiver 724 can use one or more of any number of suitable communication protocols (e.g., ISA100, HART) when sending and/or receiving signals. Such communication protocols can be dictated by the communication module 708. Further, any transceiver information for the user 750, the images 780, and/or the light sources 760 can be stored in the storage repository 730.

Optionally, in one or more example embodiments, the security module 728 secures interactions between the controller 704, the user 750, the images 780, and/or the light sources 760. More specifically, the security module 728 authenticates communication from software based on security keys verifying the identity of the source of the communication. For example, user software may be associated with a security key enabling the software of the user 750 to interact with the controller 704, the images 780, and/or the light sources 760. Further, the security module 728 can restrict receipt of information, requests for information, and/or access to information in some example embodiments.

Figure 9:
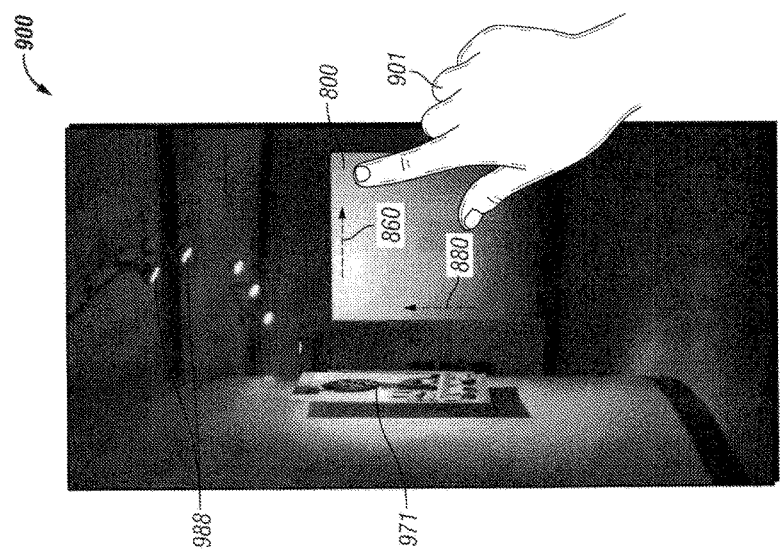
FIG. 9 shows an application in which the color control user interface of FIG. 7 can be used in accordance with certain example embodiments.
Figure 8:
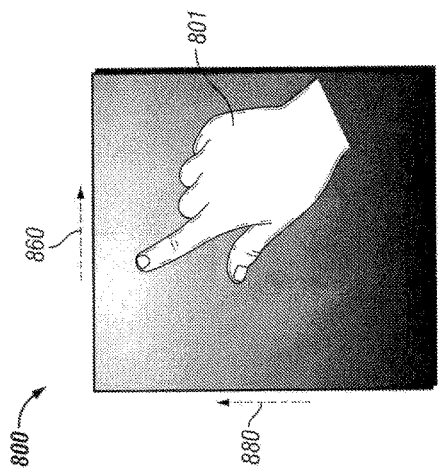
FIG. 8 shows another color control user interface in accordance with certain example embodiments.

FIG. 8 shows another color control user interface 800 in accordance with certain example embodiments, and FIG. 9 shows an application in which the color control user interface 800 of FIG. 8 can be used in accordance with certain example embodiments. In one or more embodiments, one or more of the components shown in FIGS. 8 and 9 may be omitted, added, repeated, and/or substituted. Accordingly, embodiments of color control user interfaces should not be considered limited to the specific arrangements of components shown in FIGS. 8 and 9.

Referring to FIGS. 1-9, the color control user interface 800 of FIG. 8 is useful in a lighting control application. In this case, the color control user interface 800 is a two-dimensional interface that integrates two of the three color factors. Typically, as shown in FIGS. 1-3 above, a two-dimensional color interface allows a user to select a combination of hue and saturation. By contrast, the color control user interface 800 of FIG. 8 is used as a dimming controller, while also allowing a user 801 to control the color temperature within a given range. In other words, the color control user interface 800 of FIG. 8 has a fixed hue and presents a two-dimensional interface that allows the user 801 to adjust the hue 860 and the value 880 (dimming level). In this example, the hue 860 is controlled by horizontal movement within the color control user interface 800, and the value is controlled by vertical movement within the color control user interface 800.

Embodiments of the color control user interface 800 of FIG. 8 can be used in a number of practical lighting applications. For example, as shown in FIG. 9, the color control user interface 800 can be used in a room 900 as interactive wall art or as a projection shown on a wall in the room 900. In such a case, the user 901 can use the color control user interface 800 to control the hue 860 and the value 880 (dimming level) of the lighting 988 within the room 900. The user 901 can select the hue 860 and the value 880 of the lighting 988 in the room 900 by moving a finger to a point in the two-dimensional area defined by the color control user interface 800. The lighting 988 can be directed to one or more particular objects (as, in this case, toward a painting 971) within the room 900.

Alternatively, instead of a room 900, FIG. 9 could represent a display 900 (also called, or which can include, a graphical user interface) of a device, including but not limited to a mobile device, a laptop computer, a desktop computer, and electronic tablet. In such a case, the display 900 can have superimposed thereon a color control user interface 800. In other words, in this example, the color control user interface 800 is not part of the image (in this case, a picture of a room with lighting 988 and a painting 971 on a wall) shown on the display, but rather appears over a portion of the image to allow a user 901 to control two or more color factors (e.g., hue 860, value 880) of the image. The image can be a live feed from a video camera, a recording of a scene, a still picture, a series of still pictures, or any other type of image. The color control user interface 800 can include the image shown on the display, the actual setting (e.g., room lighting from light fixtures in the room, window blinds, window tinting) from which the image is shown, or both.

As another example of the concept shown in FIG. 9, FIGS. 10A-10I show an application in which a color control user interface 1000 can be used in accordance with certain example embodiments. Specifically, FIGS. 10A-10I show a display 1055A-1055I that incorporates the color control user interface 1000 with an image 1071. In this case, the color control user interface 1000 includes a scale of hues 1060 disposed horizontally relative to the display 1055 and the image 1071, and a scale of values 1080 disposed vertically relative to the display 1055 and the image 1071. The color control user interface 1000 can be slightly larger than, and concentrically centered with, the image 1071 on the display 1055. Thus, as shown in FIGS. 10A-10I, portions of the hue 1060 can extend beyond the top and bottom of the image 1071, and portions of the value 1080 can extend beyond the sides of the image 1071.

Figure 10A:
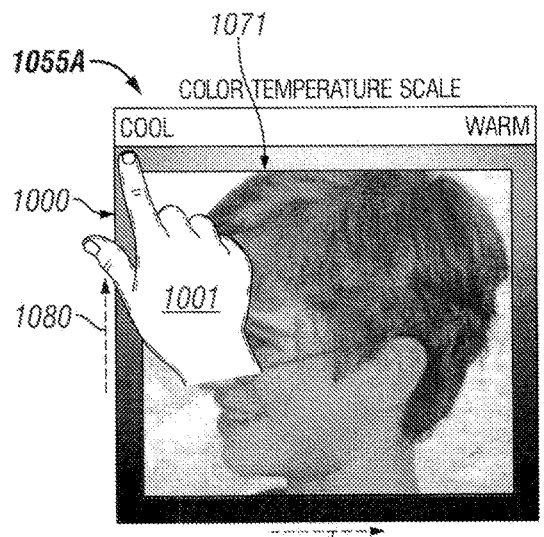
FIGS. 10A-10I show another application in which a color control user interface can be used in accordance with certain example embodiments.
Figure 10B:
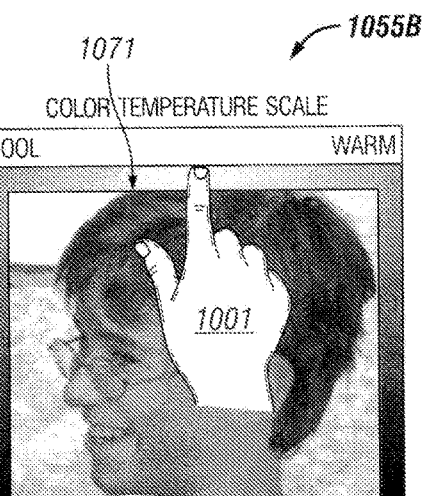
Figure 10C:
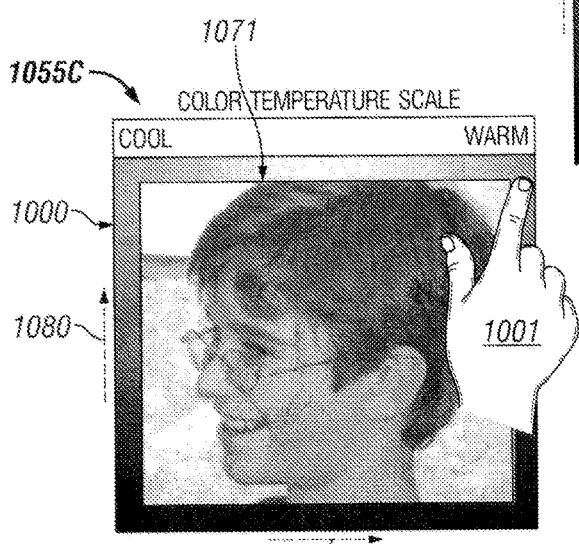

In certain example embodiments, the color control user interface 1000 can be superimposed with some or all of the image 1071. For example, in this case, the user 1001 can select the hue 1060 and value 1080 at any point within the borders of the color control user interface 1000, including on the image 1071 itself. In FIG. 10A, the user 1001 selects the lowest hue 1060 and the highest value 1080, and the image 1071 is shown on the display 1055A according to these selected settings (also called selections herein). In FIG. 10B, the user 1001 selects a mid-range hue 1060 and the highest value 1080, and the image 1071 is shown on the display 1055B according to these selected settings. In FIG. 10C, the user 1001 selects the highest hue 1060 and the highest value 1080, and the image 1071 is shown on the display 1055C according to these selected settings.

Figure 10D:
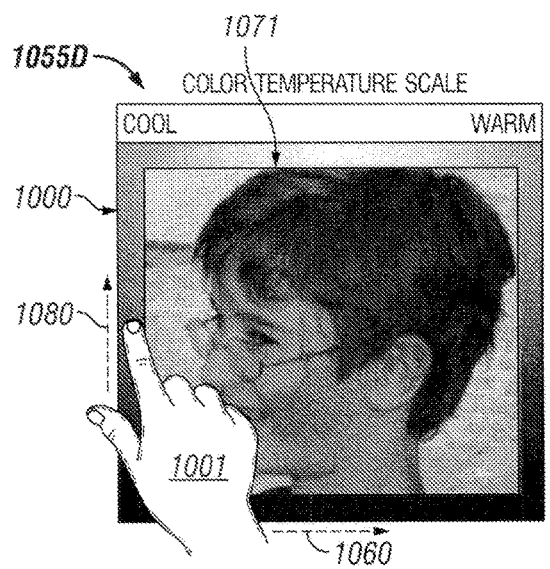
Figure 10E:
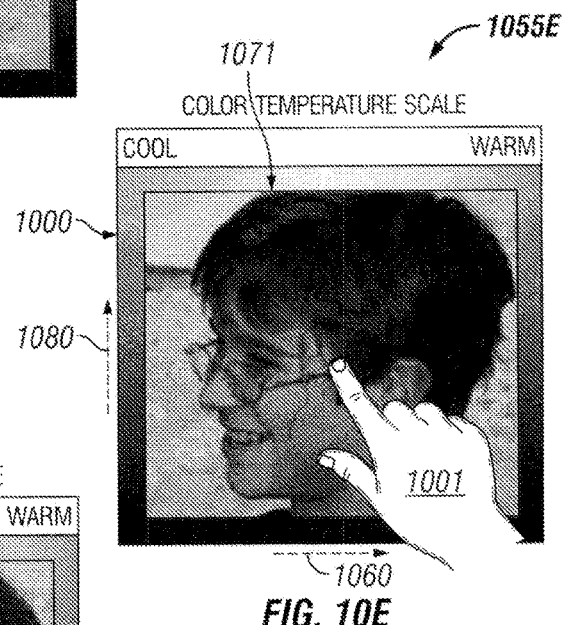
Figure 10F:
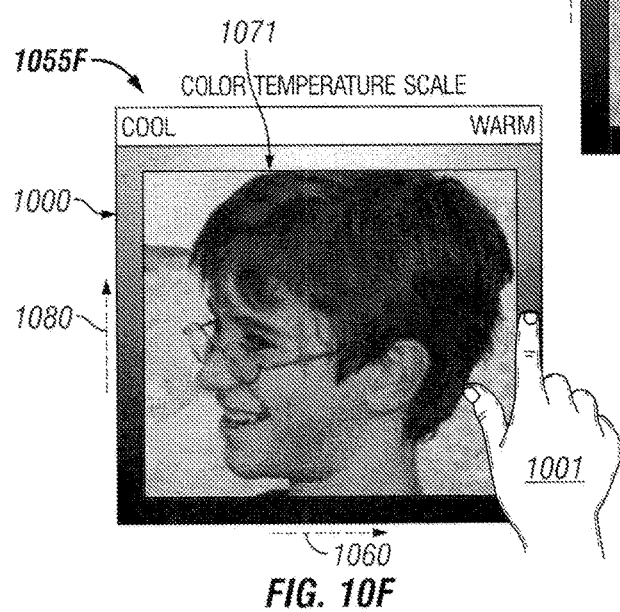
Figure 10G:
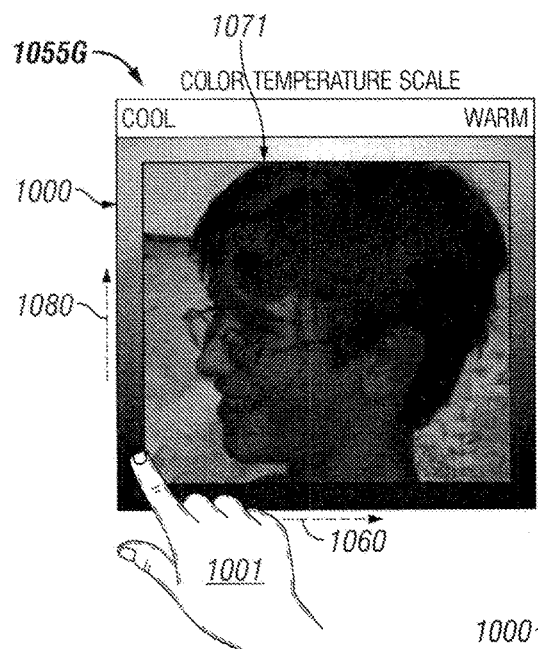
Figure 10H:
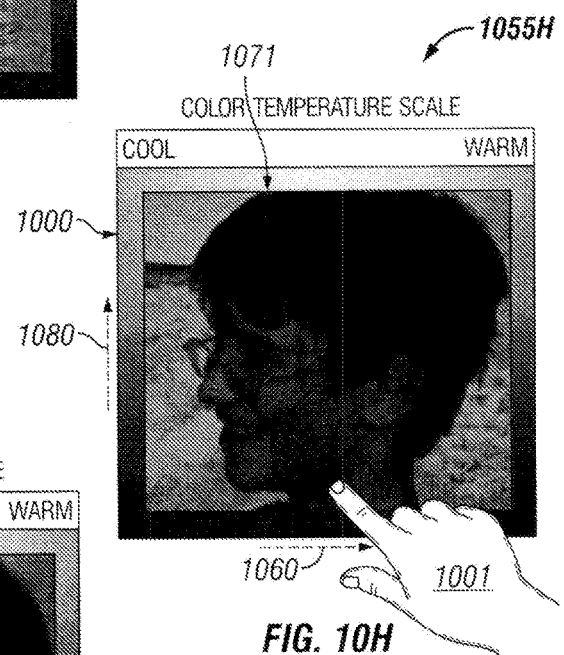
Figure 10I:
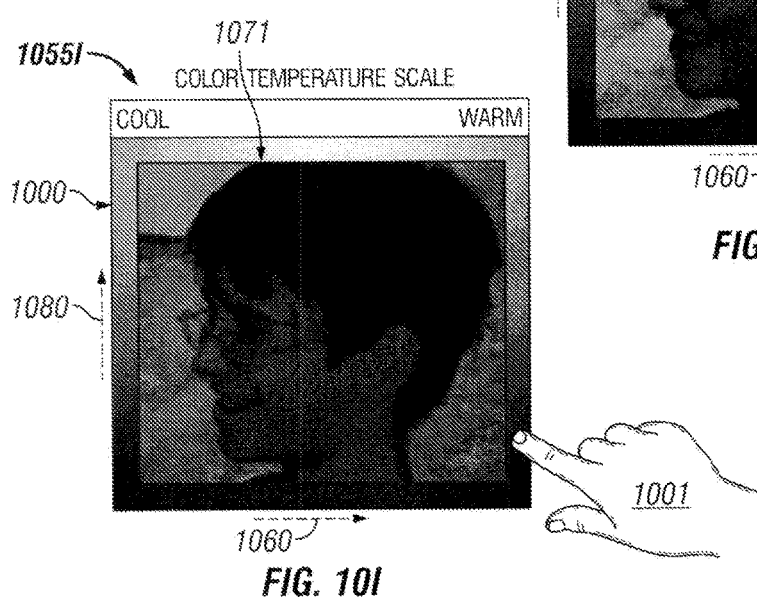

In FIG. 10D, the user 1001 selects the lowest hue 1060 and a mid-range value 1080, and the image 1071 is shown on the display 1055D according to these selected settings. In FIG. 10E, the user 1001 selects a mid-range hue 1060 and a mid-range value 1080, and the image 1071 is shown on the display 1055E according to these selected settings. In FIG. 10F, the user 1001 selects the highest hue 1060 and a mid-range value 1080, and the image 1071 is shown on the display 1055F according to these selected settings. In FIG. 10G, the user 1001 selects the lowest hue 1060 and the lowest value 1080, and the image 1071 is shown on the display 1055G according to these selected settings. In FIG. 10H, the user 1001 selects a mid-range hue 1060 and the lowest value 1080, and the image 1071 is shown on the display 1055H according to these selected settings. In FIG. 10I, the user 1001 selects the highest hue 1060 and the lowest value 1080, and the image 1071 is shown on the display 1055I according to these selected settings.

Figure 11:
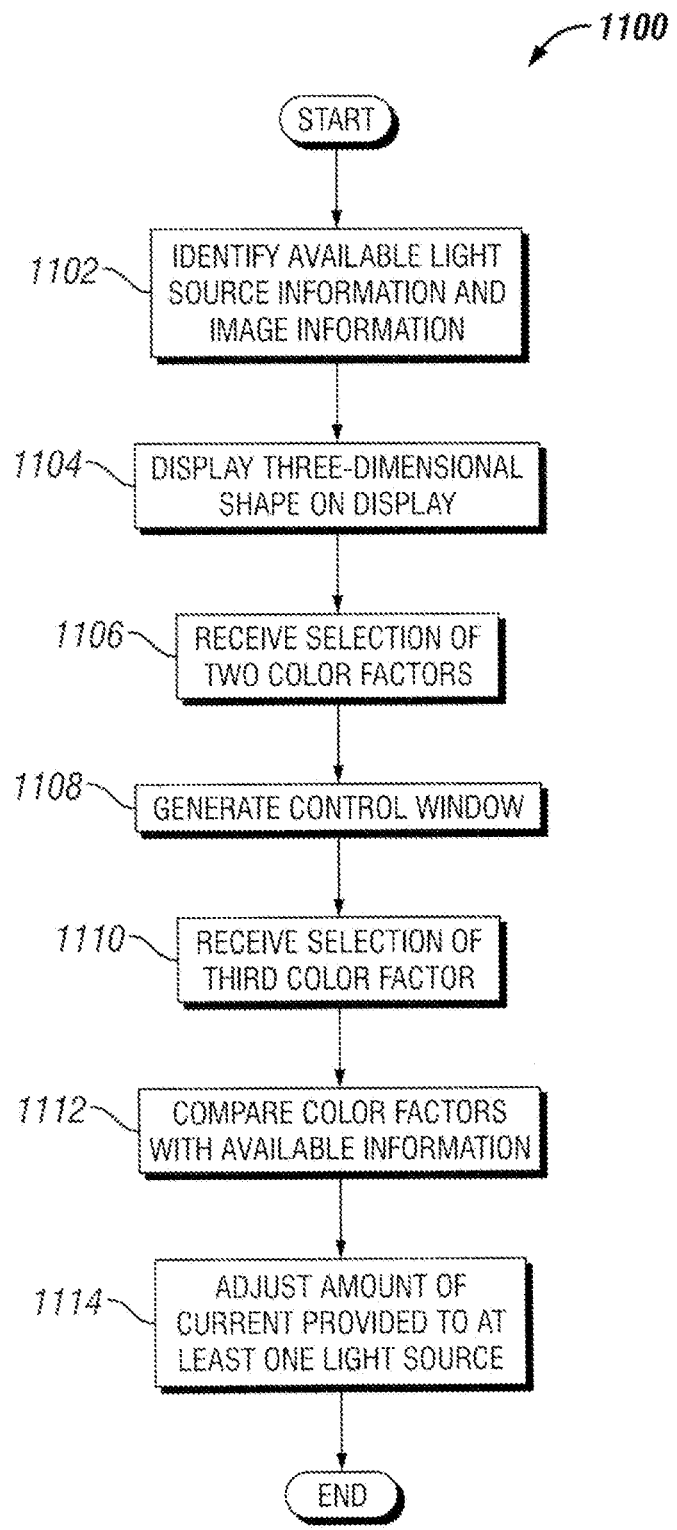
FIG. 11 shows a flowchart of a method for controlling color using a color control user interface in accordance with certain example embodiments.

FIG. 11 shows a flowchart 1100 of the method 600 for controlling color using a color control user interface, described above with respect to FIGS. 6A-6C, in accordance with certain example embodiments. While the various steps in this flowchart are presented and described sequentially, one of ordinary skill in the art will appreciate that some or all of the steps are executed in different orders, combined or omitted, and some or all of the steps are executed in parallel depending upon the exemplary embodiment. Further, in one or more of the exemplary embodiments, one or more of the steps described below are omitted, repeated, and/or performed in a different order. In addition, a person of ordinary skill in the art will appreciate that additional steps not shown in FIG. 11, is included in performing this method in certain exemplary embodiments. Accordingly, the specific arrangement of steps should not be construed as limiting the scope. In addition, a particular computing device, as described, for example, in FIG. 12 below, is used to perform one or more of the steps for the method 600 described below in certain exemplary embodiments.

Referring to FIGS. 1-11, in step 1102, available light source information 732 and image information 733 is identified. In certain example embodiments, the available light source information 732 and image information 733 is identified by the controller 704. The light source information 732 and image information 733 can be associated with one or more light sources 760 and/or one or more images 780.

In step 1104, a three-dimensional shape (e.g., three-dimensional shape 418) is displayed on a display 740. The display 740 can be a two-dimensional display. The three-dimensional shape can be displayed by the controller 704. The three-dimensional shape 418 (e.g., cylinder, sphere) can be selected by the controller 704, by a user 750, or by some other component of the color control system 700. The three-dimensional shape 418 can be displayed on the display 740 in real time by the controller 704. Each dimension of the three-dimensional shape 418 can represent a color factor. In certain example embodiments, the three-dimensional shape 418 can have two dimensions (as with an image of a photograph) or more than three dimensions.

In step 1106, a selection of two color factors is received. In certain example embodiments, the selection of the two color factors (e.g., hue 460, saturation 470, value 480) is received by the controller 704. The two color factors can be selected by a user 750 by interacting with the three-dimensional shape 418 shown on the display 740. Any changes to the three-dimensional shape 418 (e.g., the selection of one or more color factors) shown on the display 740 can be updated in real time by the controller 704.

In step 1108, a control window 450 is generated. In certain example embodiments, the control window 450 is generated by the controller 704. The control window 450 can be based, at least in part, on the two color factors selected by the user 750. The control window 450 can be integrated with the three-dimensional shape 418 on the display 740 by the controller 704. In some cases, when the two color factors are selected by the user 750, a control window 450 can appear within the three-dimensional shape 418 on the display 740. In such a case, the controller 704 can generate the control window 450. Any changes to the three-dimensional shape 418 (e.g., the appearance of the control window 450) shown on the display 740 can be updated in real time by the controller 704.

In step 1110, a selection of a third color factor is received. In certain example embodiments, the selection of the third color factor (e.g., hue 460, saturation 470, value 480) is received by the controller 704. The third color factor can be selected by a user 750 by interacting with the control window 450 within the three-dimensional shape 418 shown on the display 740. Any changes to the three-dimensional shape 418 (e.g., movement of the control window 450, the selection of the third color factor) shown on the display 740 can be updated in real time by the controller 704.

In step 1112, a comparison of the three color factors (e.g., hue 460, saturation 470, value 480) is made with the available light source information 732 and/or image information 733 of step 1102. The comparison of the three color factors with the available light source information 732 and/or image information 733 can be performed by the controller 704. As any of the available light source information 732 and/or image information 733 is changed, the controller 704 is able to incorporate these changes to such information on a real-time basis.

In step 1114, an amount of current provided to at least one light source 760 is adjusted. In certain example embodiments, the controller 704 controls the amount of current provided to at least one light source 760. By adjusting the amount of current provided to at least one light source 760, the light output of the light source 760 is changed. The amount of current provided to at least one light source 760 can be based on the selection of the three color factors made by the user 750, as described above. In other words, the amount of current provided to a light source 760 is such that the resulting output of the light source 760 corresponds to (e.g., matches) the selection of the three color factors by the user 750. The controller 704 can control the amount of current provided to a light source 760 in real time. In other words, as one or more color factors are changed by a user 750, the amount of current provided to the light source 760 (and so the output of the light source 760) is correspondingly adjusted in real time.

Since the controller 704 adjusts the current delivered to the light sources 760 and/or images 780 in real time, if the user 750 continues to make adjustments to one or more of the color factors on the three-dimensional display 418, the process can revert to step 1106 (or any other suitable step) after step 1114 is completed. Alternatively, when step 1114 is ultimately completed, the process proceeds to the END step.

Figure 12:
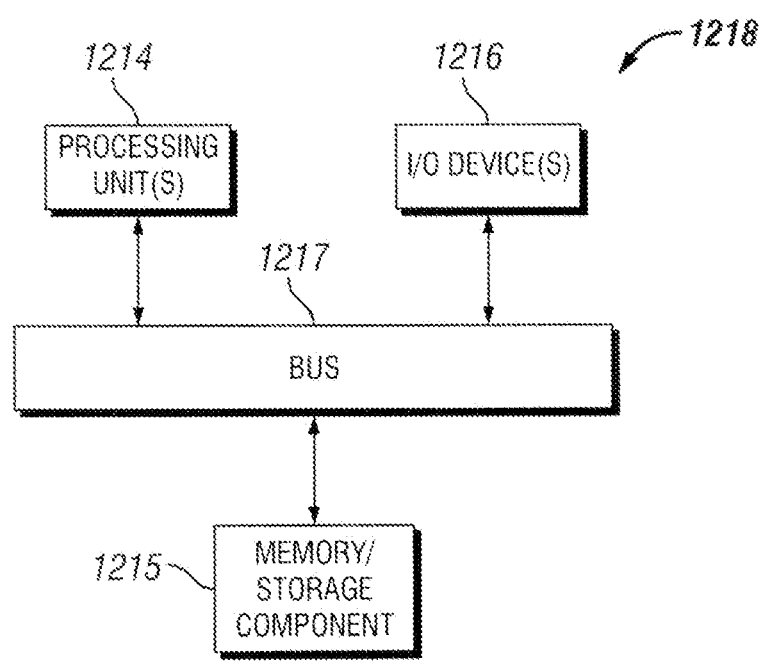
FIG. 12 shows a computing device in accordance with one or more example embodiments.

One or more of the functions performed by any of the components of an example color control system (e.g., controller 704) can be performed using a computing device 1200. An example of a computing device 1200 is shown in FIG. 12. The computing device 1200 implements one or more of the various techniques described herein, and which is representative, in whole or in part, of the elements described herein pursuant to certain example embodiments. Computing device 1200 is one example of a computing device and is not intended to suggest any limitation as to scope of use or functionality of the computing device and/or its possible architectures. Neither should computing device 1200 be interpreted as having any dependency or requirement relating to any one or combination of components illustrated in the example computing device 1200.

Computing device 1200 includes one or more processors or processing units 1202, one or more memory/storage components 1204, one or more input/output (I/O) devices 1206, and a bus 1208 that allows the various components and devices to communicate with one another. Bus 1208 represents one or more of any of several types of bus structures, including a memory bus or memory controller, a peripheral bus, an accelerated graphics port, and a processor or local bus using any of a variety of bus architectures. Bus 1208 includes wired and/or wireless buses.

Memory/storage component 1204 represents one or more computer storage media. Memory/storage component 1204 includes volatile media (such as random access memory (RAM)) and/or nonvolatile media (such as read only memory (ROM), flash memory, optical disks, magnetic disks, and so forth). Memory/storage component 1204 includes fixed media (e.g., RAM, ROM, a fixed hard drive, etc.) as well as removable media (e.g., a Flash memory drive, a removable hard drive, an optical disk, and so forth).

One or more I/O devices 1206 allow a customer, utility, or other user to enter commands and information to computing device 1200, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 1200 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 1200 includes at least the minimal processing, input, and/or output means necessary to practice one or more embodiments.

Further, those skilled in the art will appreciate that one or more elements of the aforementioned computer device 1200 is located at a remote location and connected to the other elements over a network in certain example embodiments. Further, one or more embodiments is implemented on a distributed system having one or more nodes, where each portion of the implementation (e.g., controller 704) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Example embodiments provide a number of benefits. Examples of such benefits include, but are not limited to, more simplified control of color, lighting levels, and/or other applications that directly or indirectly involve color. Example embodiments allow a user to select the three color factors of hue, saturation, and value in a substantially continuous motion. Other example embodiments allow a user to select two color factors that are normally not combined into an user interface that allows the user to make selections in a substantially continuous motion. Further, example embodiments allow for real-time adjustment in one or more light sources and/or images based on the change in one or more color factors made by a user.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A color control user interface, comprising:
   a controller comprising a control engine, a transceiver, and a memory;
   a display area; and
   a three-dimensional shape generated by the controller and disposed in the display area, wherein the three-dimensional shape comprises:
   a first axis that represents a first range of selections for a first color factor;
   a second axis that represents a second range of selections for a second color factor; and
   a third axis that represents a third range of selections for a third color factor, and wherein the control engine is configured to:
   receive a first selection of the first color factor from a user;
   receive, as the first selection continues to be received from the user, a plurality of potential second selections within the second range of selections for the second color factor and a plurality of potential third selections within the third range of selections for the third color factor;
   receive, when the first selection ceases to be selected by the user, a second selection among the plurality of potential second selections within the second range of selections for the second color factor and a third selection among the plurality of potential third selections within the third range of selections for the third color factor, wherein the first selection, the second selection, and the third selection make up user selections;
   compare the user selections to light source information stored in the memory; and
   send commands via the transceiver to at least one light source, wherein the commands adjust an amount of current delivered to the at least one light source.

2. The color control user interface of claim 1, wherein the first color control factor is a hue of a color, wherein the second color control factor is a saturation of the color, and wherein the third color control factor is a value of the color.

3. The color control user interface of claim 1, wherein the three-dimensional shape is a cylinder.

4. The color control user interface of claim 1, wherein the three-dimensional shape is a cone.

5. The color control user interface of claim 1, wherein the three-dimensional shape further comprises a control window that is created by the controller when the first selection among the first range of selections for the first color factor and the second selection among the second range of selections for the second color factor are selected.

6. The color control user interface of claim 5, wherein the control window exposes the third axis and allows a user to select the third selection among the third range of selections for the third color factor.

7. The color control user interface of claim 6, wherein the first selection, the second selection, and the third selection are selected by a user without losing contact with the display area, and wherein the controller is configured to adjust the amount of current delivered to the at least one light source at substantially the same time that the user selects the first selection, the second selection, and the third selection.

8. The color control user interface of claim 5, wherein the first selection and the second selection are adjustable within the control window.

9. A color control user interface for lighting control, comprising:
   a first color factor generated by a controller, using a hardware processor, and shown as a first part of an image shown in at least three dimensions on a display, wherein the first color factor comprises a plurality of first selections in the first part of the image; and
   a second color factor generated by the controller, using the hardware processor, and shown as a second part of the image on the display, wherein the second color factor comprises a plurality of second selections in the second part of the image,
   wherein the first color factor and the second color factor are integrated, using the controller and the hardware processor, within an image shown on the display, wherein a first selection among the plurality of first selections is made by a user on the first part of the image for the first color factor, wherein, as the first selection of the first color factor continues to be made by the user, the second plurality of selections in the second part of the image is revealed to the user, wherein, when the first selection of the first color factor ceases to be made by the user, a second selection of the second color factor among the plurality of second selections in the second part of the image is made, and wherein the controller, using the hardware processor, is configured to compare the first selection and the second selection to light source information stored in memory, and to send commands, using a transceiver, to at least one light source, wherein the commands adjust an amount of current delivered to the at least one light source based on the first selection of the first color factor and the second selection of the second color factor.

10. The color control user interface of claim 9, wherein the first color factor is a hue of a color, and wherein the second color factor is a value of the color.

11. The color control user interface of claim 9, wherein the image is a live feed showing video.

12. The color control user interface of claim 11, wherein the image is in a lighting-controlled space, and wherein the controller controls, in real time and based on the first selection and the second selection, at least one lighting control in the lighting-controlled space.

13. The color control user interface of claim 9, wherein the image is a static image.

14. The color control user interface of claim 9, wherein the first selection and the second selection are shown on the image by the controller in real time.

15. The color control user interface of claim 9, wherein the user selects a third selection for the first color factor of the image shown in the display and a fourth selection for the second color factor of the image shown in the display, wherein the third selection and the fourth selection are selected by the user and received by the controller in a second single action by the user on the display, and wherein the controller adjusts the amount of current delivered to the at least one light source based on the third selection of the first color factor and the fourth selection of the second color factor.

16. An electronic device, comprising:
a housing;
a controller comprising a control engine, a transceiver, and a memory, wherein the controller generates an image and controls one or more light sources;
a display disposed on the housing and coupled to the controller, wherein the display displays the image, wherein the image comprises:
a first color factor shown as a first part of the image and comprising a plurality of first selections in the first part of the image; and
a second color factor shown as a second part of the image and comprising a plurality of second selections in the second part of the image,
wherein the controller receives on the image a first selection of the plurality of first selections from the user,
wherein the control engine, as the first selection of the first color factor is maintained by the user, displays the plurality of second selections in the second part of the image,
wherein the control engine, when the first selection of the first color factor is no longer maintained by the user, receives on the image a second selection of the plurality of second selections of the second color factor in the second part of the image, and
wherein the control engine of the controller compares the first selection and the second selection to light source information stored in the memory, and, simultaneously using the transceiver, adjusts an amount of current delivered to the one or more light sources, wherein the amount of current corresponds to the first selection of the first color factor and the second selection of the second color factor.

17. The electronic device of claim 16, wherein the display is a graphical user interface.

18. The electronic device of claim 16, wherein the controller sends the first selection and the second selection to a remote device using a DALI communication protocol.

19. The electronic device of claim 16, wherein the image is a three-dimensional shape, and wherein the image further comprises a third color factor shown as a third part of the image and comprising a plurality of third selections in the third part of the image,
wherein the control engine, when the first selection is no longer maintained by the user, receives on the image a third selection of the plurality of third selections in the third part of the image, and
wherein the control engine of the controller receives the first selection, the second selection, and the third selection and, substantially simultaneously, adjusts the amount of current to the one or more light sources, wherein the amount of current corresponds to the first selection of the first color factor, the second selection of the second color factor, and the third selection of the third color factor.

* * * * *